United States Patent
Krishan

(10) Patent No.: US 11,528,334 B2
(45) Date of Patent: Dec. 13, 2022

(54) METHODS, SYSTEMS, AND COMPUTER READABLE MEDIA FOR PREFERRED NETWORK FUNCTION (NF) LOCATION ROUTING USING SERVICE COMMUNICATIONS PROXY (SCP)

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/945,794

(22) Filed: Jul. 31, 2020

(65) Prior Publication Data

US 2022/0038545 A1    Feb. 3, 2022

(51) Int. Cl.
*H04L 67/51* (2022.01)
*H04L 45/74* (2022.01)
*H04L 61/4511* (2022.01)

(52) U.S. Cl.
CPC .............. *H04L 67/51* (2022.05); *H04L 45/74* (2013.01); *H04L 61/4511* (2022.05)

(58) Field of Classification Search
CPC ..... H04L 67/16; H04L 61/1511; H04L 45/54; H04L 45/74; H04L 69/22; H04L 67/51; H04L 61/4511; H04W 28/0925
See application file for complete search history.

(56) References Cited

U.S. PATENT DOCUMENTS

| | | | |
|---|---|---|---|
| 5,381,413 A | 1/1995 | Tobagi et al. | |
| 5,592,672 A | 1/1997 | Grewal et al. | |

(Continued)

FOREIGN PATENT DOCUMENTS

| | | |
|---|---|---|
| CN | 1700694 A | 11/2005 |
| CN | 101151861 A | 3/2008 |

(Continued)

OTHER PUBLICATIONS

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

(Continued)

*Primary Examiner* — Backhean Tiv
*Assistant Examiner* — Linh T. Nguyen
(74) *Attorney, Agent, or Firm* — Jenkins, Wilson, Taylor & Hunt, P.A.

(57) ABSTRACT

A method for preferred network function (NF) location based routing using a service communication proxy (SCP) includes receiving a service request message from a consumer NF. The method further includes performing, by an SCP, a lookup in a preferred NF location routing rules database at the SCP using at least one parameter extracted from the service request message. The method further includes locating, by the SCP and in the preferred NF location routing rules database, a preferred NF location routing rule corresponding to the at least one parameter extracted from the service request message. The method further includes selecting, by the SCP, a producer NF to process the service request based on application of the preferred NF location routing rule. The method further includes routing, by the SCP, the service request message to the producer NF.

20 Claims, 8 Drawing Sheets

(56) References Cited

U.S. PATENT DOCUMENTS

| | | |
|---|---|---|
| 5,719,861 A | 2/1998 | Okanoue |
| 6,014,558 A | 1/2000 | Thomas |
| 6,105,034 A | 8/2000 | Buckler |
| 6,366,577 B1 | 4/2002 | Donovan |
| 6,385,198 B1 | 5/2002 | Ofek et al. |
| 6,404,746 B1 | 6/2002 | Cave et al. |
| 6,725,278 B1 | 4/2004 | Gonzalez |
| 6,725,401 B1 | 4/2004 | Lindhorst-Ko |
| 6,735,291 B1 | 5/2004 | Schmid et al. |
| 6,748,435 B1 | 6/2004 | Wang et al. |
| 7,151,945 B2 | 12/2006 | Myles et al. |
| 7,308,499 B2 | 12/2007 | Chavez |
| 7,706,822 B2 | 4/2010 | Emeott et al. |
| 7,742,421 B2 | 6/2010 | Bantukul et al. |
| 7,782,776 B2 | 8/2010 | Shankar et al. |
| 7,929,419 B2 | 4/2011 | Sprague |
| 8,023,482 B2 | 9/2011 | Gong et al. |
| 8,300,637 B1 | 10/2012 | Bennett, III et al. |
| 8,306,034 B2 | 11/2012 | Jang et al. |
| 8,498,202 B2 | 7/2013 | Kanode et al. |
| 8,620,858 B2 | 12/2013 | Backholm et al. |
| 8,645,565 B2 | 2/2014 | Sparks et al. |
| 8,767,705 B2 | 7/2014 | Göppner et al. |
| 8,811,228 B2 | 8/2014 | Lopez et al. |
| 8,811,372 B2 | 8/2014 | Li et al. |
| 8,824,449 B2 | 9/2014 | van der Wateren et al. |
| 8,879,431 B2 | 11/2014 | Ridel et al. |
| 8,954,080 B2 | 2/2015 | Janakiraman et al. |
| 9,071,512 B2 | 6/2015 | Marsico |
| 9,124,537 B2 | 9/2015 | Kolze |
| 9,246,762 B1 | 1/2016 | Watkins |
| 9,386,551 B2 | 7/2016 | Zhou et al. |
| 9,667,590 B2 | 5/2017 | Yan et al. |
| 10,097,504 B2 | 10/2018 | Backholm |
| 10,285,155 B1 | 5/2019 | Dodd-Noble et al. |
| 10,299,128 B1 | 5/2019 | Suthar et al. |
| 10,313,362 B2 | 6/2019 | Ahuja et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,609,530 B1 * | 3/2020 | Patil ............... H04L 67/16 |
| 10,616,934 B2 | 4/2020 | Talebi Fard et al. |
| 10,637,753 B1 | 4/2020 | Taft et al. |
| 10,652,098 B2 | 5/2020 | Kim |
| 10,772,062 B2 | 9/2020 | Albasheir et al. |
| 10,778,527 B2 | 9/2020 | Assali et al. |
| 10,791,044 B1 | 9/2020 | Krishan et al. |
| 10,819,636 B1 | 10/2020 | Goel |
| 10,833,938 B1 * | 11/2020 | Rajput ............... H04L 67/1095 |
| 10,880,370 B2 | 12/2020 | Seenappa et al. |
| 11,018,971 B2 | 5/2021 | Mahalank et al. |
| 11,082,393 B2 | 8/2021 | Goel |
| 11,109,307 B2 | 8/2021 | Bartolomé Rodrigo et al. |
| 11,159,359 B2 | 10/2021 | Goel |
| 11,224,009 B2 | 1/2022 | Krishan |
| 11,271,846 B2 | 3/2022 | Krishan |
| 11,290,549 B2 | 3/2022 | Krishan |
| 11,323,413 B2 | 5/2022 | Goel |
| 2001/0039585 A1 | 11/2001 | Primak et al. |
| 2003/0086410 A1 | 5/2003 | Eikkula |
| 2003/0174649 A1 | 9/2003 | Shankar et al. |
| 2003/0223414 A1 | 12/2003 | Wong |
| 2004/0003069 A1 | 1/2004 | Wong |
| 2004/0062278 A1 | 4/2004 | Hadzic et al. |
| 2004/0088424 A1 | 5/2004 | Park et al. |
| 2004/0114744 A1 | 6/2004 | Trossen |
| 2004/0141473 A1 | 7/2004 | Buot |
| 2004/0158606 A1 | 8/2004 | Tsai |
| 2004/0205190 A1 | 10/2004 | Chong et al. |
| 2004/0208183 A1 | 10/2004 | Balachandran et al. |
| 2004/0221061 A1 | 11/2004 | Chavez |
| 2005/0181776 A1 | 8/2005 | Verma et al. |
| 2005/0193096 A1 | 9/2005 | Yu et al. |
| 2005/0207402 A1 | 9/2005 | Kobayashi et al. |
| 2005/0227685 A1 | 10/2005 | Costa Requena et al. |
| 2005/0232407 A1 | 10/2005 | Craig et al. |
| 2006/0010224 A1 | 1/2006 | Sekar et al. |
| 2006/0010321 A1 | 1/2006 | Nakamura et al. |
| 2006/0069776 A1 | 3/2006 | Shim et al. |
| 2006/0101143 A1 | 5/2006 | Garcia et al. |
| 2006/0104210 A1 | 5/2006 | Nielsen |
| 2006/0253563 A1 | 11/2006 | Yang et al. |
| 2007/0050331 A1 * | 3/2007 | Bauman ............... H04L 12/66 370/352 |
| 2007/0156909 A1 | 7/2007 | Osborn et al. |
| 2007/0191004 A1 | 8/2007 | Yamakawa et al. |
| 2007/0237311 A1 | 10/2007 | Ofir et al. |
| 2007/0242738 A1 | 10/2007 | Park et al. |
| 2008/0101293 A1 | 5/2008 | Woo et al. |
| 2008/0165761 A1 | 7/2008 | Goppner et al. |
| 2008/0280623 A1 | 11/2008 | Danne et al. |
| 2009/0006652 A1 | 1/2009 | Kasatani |
| 2009/0024727 A1 | 1/2009 | Jeon et al. |
| 2009/0055835 A1 | 2/2009 | Zhu |
| 2009/0141625 A1 | 6/2009 | Ghai et al. |
| 2009/0185494 A1 | 7/2009 | Li et al. |
| 2009/0222584 A1 | 9/2009 | Josefsberg et al. |
| 2009/0268723 A1 | 10/2009 | Przybysz |
| 2010/0261490 A1 | 10/2010 | Berry et al. |
| 2011/0078674 A1 | 3/2011 | Ershov |
| 2011/0202604 A1 | 8/2011 | Craig et al. |
| 2012/0079082 A1 | 3/2012 | Ding et al. |
| 2013/0029708 A1 | 1/2013 | Fox et al. |
| 2013/0039176 A1 | 2/2013 | Kanode et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2014/0075004 A1 | 3/2014 | Van Dusen et al. |
| 2014/0379901 A1 | 12/2014 | Tseitlin et al. |
| 2015/0003296 A1 | 1/2015 | Fan et al. |
| 2015/0016266 A1 | 1/2015 | Dumitrescu et al. |
| 2015/0039560 A1 | 2/2015 | Barker et al. |
| 2015/0071074 A1 | 3/2015 | Zaidi et al. |
| 2015/0249588 A1 | 9/2015 | Leon et al. |
| 2015/0263987 A1 | 9/2015 | Klein et al. |
| 2015/0351084 A1 | 12/2015 | Werb |
| 2016/0142324 A1 | 5/2016 | Vihtari et al. |
| 2016/0149811 A1 | 5/2016 | Roch et al. |
| 2016/0156513 A1 | 6/2016 | Zhang et al. |
| 2016/0164788 A1 | 6/2016 | Goel et al. |
| 2016/0183156 A1 | 6/2016 | Chin et al. |
| 2016/0234119 A1 | 8/2016 | Zaidi et al. |
| 2016/0315743 A1 | 10/2016 | Nagaraj et al. |
| 2016/0344635 A1 | 11/2016 | Lee et al. |
| 2016/0350683 A1 | 12/2016 | Bester et al. |
| 2016/0352588 A1 | 12/2016 | Subbarayan et al. |
| 2016/0380906 A1 | 12/2016 | Hodique et al. |
| 2017/0187673 A1 | 6/2017 | Kaliski, Jr. et al. |
| 2017/0220367 A1 | 8/2017 | Li et al. |
| 2017/0221015 A1 | 8/2017 | June et al. |
| 2017/0353387 A1 | 12/2017 | Kwak et al. |
| 2018/0039494 A1 | 2/2018 | Lander et al. |
| 2018/0083882 A1 | 3/2018 | Krishan et al. |
| 2018/0159780 A1 | 6/2018 | Essigmann et al. |
| 2018/0183724 A1 | 6/2018 | Callard et al. |
| 2018/0205637 A1 * | 7/2018 | Li ............... H04L 41/40 |
| 2018/0213391 A1 | 7/2018 | Inoue |
| 2018/0227243 A1 | 8/2018 | Zhang et al. |
| 2018/0262592 A1 | 9/2018 | Zandi et al. |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0036871 A1 | 1/2019 | Lapidous et al. |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |

(56) References Cited

U.S. PATENT DOCUMENTS

| | | |
|---|---|---|
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230556 A1 | 7/2019 | Lee |
| 2019/0238642 A1 | 8/2019 | Sesham et al. |
| 2019/0261244 A1 | 8/2019 | Jung et al. |
| 2019/0268270 A1 | 8/2019 | Fattah |
| 2019/0306251 A1 | 10/2019 | Talebi Fard et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0007632 A1 | 1/2020 | Landais et al. |
| 2020/0008069 A1 | 1/2020 | Zhu et al. |
| 2020/0028920 A1 | 1/2020 | Livanos et al. |
| 2020/0029197 A1 | 1/2020 | Tandon et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0076764 A1 | 3/2020 | Robitzsch et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0106812 A1* | 4/2020 | Verma .............. H04W 12/121 |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0177629 A1 | 6/2020 | Hooda et al. |
| 2020/0192725 A1 | 6/2020 | Feldkamp |
| 2020/0305033 A1* | 9/2020 | Keller .............. H04L 65/1016 |
| 2020/0313996 A1 | 10/2020 | Krishan et al. |
| 2020/0314615 A1* | 10/2020 | Patil .................. H04L 41/12 |
| 2020/0336554 A1* | 10/2020 | Deshpande .......... H04L 69/22 |
| 2020/0404608 A1 | 12/2020 | Albasheir et al. |
| 2020/0412597 A1 | 12/2020 | Goel et al. |
| 2021/0000723 A1 | 1/2021 | Strand et al. |
| 2021/0007023 A1 | 1/2021 | Umapathy et al. |
| 2021/0044481 A1 | 2/2021 | Xu et al. |
| 2021/0067480 A1 | 3/2021 | Goel |
| 2021/0067485 A1 | 3/2021 | Goel |
| 2021/0105214 A1 | 4/2021 | Goel et al. |
| 2021/0111985 A1 | 4/2021 | Mahalank et al. |
| 2021/0136602 A1* | 5/2021 | Pokkunuri .......... H04W 24/02 |
| 2021/0168055 A1* | 6/2021 | Lair .................. H04L 41/5087 |
| 2021/0204200 A1 | 7/2021 | Krishan et al. |
| 2021/0235254 A1* | 7/2021 | Farooq .................. H04L 67/10 |
| 2021/0273977 A1* | 9/2021 | Karasaridis ......... H04L 63/0876 |
| 2021/0274392 A1* | 9/2021 | Dao .................... H04W 36/18 |
| 2021/0297935 A1* | 9/2021 | Belling ................ H04L 45/00 |
| 2021/0367916 A1* | 11/2021 | Belling ................ H04L 67/16 |
| 2021/0385286 A1 | 12/2021 | Wang et al. |
| 2021/0385732 A1* | 12/2021 | Reyes .................. H04L 67/52 |
| 2022/0015023 A1 | 1/2022 | De-Gregorio-Rodriguez et al. |
| 2022/0060547 A1 | 2/2022 | Krishan |
| 2022/0070648 A1 | 3/2022 | Krishan |
| 2022/0131945 A1 | 4/2022 | Sapra et al. |
| 2022/0240171 A1 | 7/2022 | Singh |

FOREIGN PATENT DOCUMENTS

| | | |
|---|---|---|
| CN | 101366311 A | 2/2009 |
| CN | 101512971 A | 8/2009 |
| CN | 105635345 B | 2/2019 |
| CN | 109788078 A | 5/2019 |
| EP | 0 950 952 A2 | 10/1999 |
| EP | 1 175 074 A2 | 1/2002 |
| EP | 2 575 303 A1 | 4/2013 |
| IN | 333811 | 3/2020 |
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 2008/019056 A2 | 2/2008 |
| WO | WO 2008/144927 A1 | 12/2008 |
| WO | WO 2009/018418 A2 | 2/2009 |
| WO | WO 2011/100629 A2 | 8/2011 |
| WO | WO 2017/143915 A1 | 8/2017 |
| WO | WO 2018/174021 A1 | 9/2018 |
| WO | WO 2018/174516 A1 | 9/2018 |
| WO | WO 2019/144321 A1 | 1/2019 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/215308 A1 | 11/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |
| WO | WO 2021/138074 A1 | 7/2021 |
| WO | WO 2022/046170 A1 | 3/2022 |
| WO | WO 2022/050987 A1 | 3/2022 |
| WO | WO 2022/093319 A1 | 5/2022 |

OTHER PUBLICATIONS

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Hearing Notice for Indian Patent Application Serial No. 7526/CHENP/2012 (Feb. 10, 2021).

Notice of Allowance and Fee(s) Due for U.S. Appl. No. 16/601,380 (dated Jan. 19, 2021).

Commonly-Assigned, co-pending U.S. Appl. No. 17/082,871 for "Methods, Systems, and Computer Readable Media for Rank Processing for Network Function Selection," (Unpublished, filed Oct. 28, 2020).

Commonly-Assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

Non-Final Office Action for U.S. Appl. No. 16/697,021 (dated Sep. 29, 2020).

Notice of Allowance and Fee(s) Due for U.S. Appl. No. 16/527,988 (dated Sep. 17, 2020).

Final Office Action for U.S. Appl. No. 16/356,446 (dated Sep. 8, 2020).

Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

Notice of Allowance and Fee(s) Due and Examiner-Initiated Interview Summary for U.S. Appl. No. 16/453,955 (dated Aug. 26, 2020).

Notification of the Transmittal of the International Search Report and the Written Opinion of the International Searching Authority, or the Declaration for International Application No. PCT/US2020/034723 (dated Aug. 17, 2020).

(56) References Cited

OTHER PUBLICATIONS

Non-Final Office Action for U.S. Appl. No. 16/555,817 (dated Aug. 7, 2020).
Commonly-Assigned, co-pending U.S. Appl. No. 16/932,226 for "Methods, Systems, and Computer Readable Media for Monitoring Machine Type Communications (MTC) Device Related Information," (Unpublished, filed Jul. 17, 2020).
Notification of Transmittal of the International Search Report and the Written Opinion of the International Searching Authority, or the Declaration for International Application Serial No. PCT/US2020/035004 (dated Jul. 7, 2020).
Ex Parte Quayle Action for U.S. Appl. No. 16/527,988 (Jun. 1, 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
Notification of Transmittal of the International Search Report and the Written Opinion of the International Searching Authority, or the Declaration for International Application Serial No. PCT/US2019/053912 (dated Dec. 18, 2019).
Commonly-Assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).
Cheshire et al., "Apple's DNS Long-Lived Queries protocol," Network Working Group, Apple, Inc., pp. 1-26 (Aug. 22, 2019).
"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).
Commonly-Assigned, co-pending U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).

"3rd Generation Partnership Project; Technical Specification Group Core Network and Terminals; Numbering, addressing and identification (Release 15)," 3GPP TS 23.003, V15.7.0, pp. 1-131 (Jun. 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
"Addressing 5G Network Function Requirements," Intel® FPGAs and Intel Pac 5G QoS and IPSec Benchmarking, White Paper, pp. 1-8 (Oct. 2018).
"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"CPS vDRA Configuration Guide," Release 18.3.0 (Restricted Release)(1), Cisco, pp. 1-130 (Sep. 14, 2018).
"How To Do Rate Limiting of Diameter Messages Using NetScaler," Citrix Systems Inc., pp. 1-3 (Sep. 4, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Mayer, "RESTful APIs for the 5G Service Based Architecture," Journal of ICT, vol. 6_1&2, pp. 101-116(2018).
"5G Service Based Architecture (SBA)," 5G, pp. 1-61 (downloaded Dec. 24, 2018).
Scholl et al., "An API First Approach to Microservices Development," Oracle, https://blogs.oracle.com/developers/an-api-first-approach-to-microservices-development, pp. 1-12 (Nov. 8, 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).

(56) References Cited

OTHER PUBLICATIONS

"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).

"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).

Carlton et al., "HTTP and DNS in a 5G World," https://www.computerworld.com/article/3204594/http-and-dns-in-a-5g-world.html, pp. 1-5 (Jun. 30, 2017).

Benacer et al., "A High-Speed Traffic Manager Architecture for Flow-Based Networking," pp. 1-4 (2017).

"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

"Multi-Layer Security Protection for Signaling Networks," Oracle Communications, Oracle white paper, pp. 1-9 (Jan. 2016).

Kantola et al., "Policy-based communications for 5G mobile with customer edge switching," Security and Communication Networks, vol. 9, pp. 3070-3082 (2016).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Abley et al., "A Mechanism for Remote-Triggered DNS Cache Flushes (DNS FLUSH)," Network Working Group, Google, pp. 1-12 (Jun. 24, 2013).

Preston-Werner, "Semantic Versioning 2.0.0", Oracle, pp. 1-5 (Jun. 2013).

"LTE and Beyond," https://ytd2525.wordpress.com/2013/03/06/lte-and-beyond/, 3 pages (2013).

Fajardo et al., "Diameter Based Protocol," Internet Engineering Task Force (IETF) Request for Comments: 6733, pp. 1-152 (Oct. 2012).

Gulbrandsen et al., "A DNS RR for specifying the location of services (DNS SRV)," RFC 2782, pp. 1-12 (Feb. 2000).

Nichols et al., "Definition of the Differentiated Services Field (DS Field) in the IPv4 and IPv6 Headers," Internet Engineering Task Force (IEFT) Netwok Working Group Request for Comments (RFC) 2474, The Internet Society, pp. 1-20 (Dec. 1998).

Commonly-Assigned, co-pending U.S. Appl. No. 17/356,451 for "Methods, Systems, and Computer Readable Media for Resolution of Inter-Network Domain Names" (Unpublished, filed Jun. 23, 2021).

Notification of Transmittal of the International Search Report and the Written Opinion of the International Searching Authority, or the Declaration for U.S. Patent Application Serial No. PCT/US2021/020120 (dated Jun. 1, 2021).

Notification of Transmittal of the International Search Report and the Written Opinion of the International Searching Authority, or the Declaration for U.S. Patent Application Serial No. PCT/US2021/020122 (dated Jun. 1, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

Nokia et al., "Discussion paper on authorization for Model D Indirect communications", 3GPP TSG SA WG3; S3-194380 (Nov. 11, 2019).

Notice of Allowance and Fee(s) Due for U.S. Appl. No. 16/697,021 (dated Jun. 21, 2021).

Non-Final Office Action for U.S. Appl. No. 16/356,446 (dated Jun. 16, 2021).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

Final Office Action for U.S. Appl. No. 16/697,021 (dated Feb. 2, 2021).

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Applicant-Initiated Interview Summary for U.S. Appl. No. 16/697,021 (dated Jan. 26, 2021).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Commonly-Assigned, co-pending U.S. Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances."

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Commonly-Assigned, co-pending U.S. Appl. No. 17/001,599 for "Methods, Systems, and Computer Readable Media for Optimized Network Function (NF) Discovery and Routing Using Service Communications Proxy (SCP) And NF Repositor Function (NRF)," (Unpublished filed Aug. 24, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

Notice of Publication for International Application Serial No. PCT/US2020/061885 (dated Jun. 3, 2021).

Notice of Allowance and Fee(s) Due for U.S. Appl. No. 17/001,599 (dated May 17, 2021).

Advisory Action for U.S. Appl. No. 16/697,021 (dated May 7, 2021).

Applicant-Initiated Interview Summary for U.S. Appl. No. 17/001,599 (dated May 5, 2021).

(56) References Cited

OTHER PUBLICATIONS

Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (Apr. 7, 2021).
Notice of Allowance and Fee(s) Due for U.S. Appl. No. 16/555,817 (dated Mar. 24, 2021).
Commonly-Assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Commonly-Assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Non-Final Office Action for U.S. Appl. No. 16/601,380 (dated Sep. 15, 2020).
Commonly-Assigned, co-pending U.S. Appl. No. 16/601,380 for "Methods, Systems, and Computer Readable Media for Distributing Network Function (NF) Topology Information Among Proxy Nodes and for Using the NF Topology Information for Inter-Proxy Node Message Routing," (Unpublished, filed Oct. 14, 2019).
Commonly-Assigned, co-pending International Application No. PCT/US19/53912 for "Methods, Systems, and Computer Readable Media for Providing a Service Proxy Function in a Telecommunications Network Core Using a Service-Based Architecture," (Unpublished, filed Sep. 30, 2019).
Commonly-Assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
Hearing Notice for Indian Application No. 1106/CHENP/2009 (May 28, 2015).
Notice of Allowance and Fee(s) Due for U.S. Appl. No. 13/197,566 (dated Feb. 20, 2015).
Notification of the Second Office Action for Chinese Application No. 201180013381.1 (dated Feb. 10, 2015).
Notification of Reexamination for Chinese Application No. 200880109633.9 (dated Jan. 29, 2015).
Extended European Search Report for European Patent Application No. 08796925.9 (dated Nov. 21, 2014).
Non-Final Office Action for U.S. Appl. No. 13/197,566 (dated Aug. 27, 2014).
Notification of Reexamination for Chinese Patent Application No. 200880109633.9 (dated Jul. 28, 2014).
Notification of the First Office Action for Chinese Application No. 201180013381.1 (dated Jun. 5, 2014).
First Examination Report for Indian Patent Application No. 1106/CHENP/2009 (dated Jan. 28, 2014).
Extended European Search Report for European Application No. 07836478.3 (dated Nov. 18, 2013).
Notice of Allowance and Fee(s) Due for U.S. Appl. No. 13/026,153 (dated Apr. 15, 2013).
Communication of European Publication No. and Information on the Application of Article 67(3) EPC for European Patent Application No. 11742923.3 (dated Nov. 21, 2012).
First Office Action for Chinese Patent Application No. 200820109633.9 (dated May 3, 2012).
Notification of Transmittal of the International Search Report and the Written Opinion of the International Searching Authority, or the Declaration for International Application No. PCT/US2011/024645 (dated Oct. 28, 2011).
Notice of Allowance for U.S. Appl. No. 11/510,284 (dated Dec. 9, 2010).
Chinese Office Action for Chinese Patent Application No. 200780036907.1 (dated Oct. 11, 2010).
Final Official Action for U.S. Appl. No. 11/510,284 (dated Jun. 22, 2010).
Official Action for U.S. Appl. No. 11/510,284 (dated Feb. 23, 2010).
Notice of Allowance and Fee(s) Due for U.S. Appl. No. 12/183,406 (dated Feb. 12, 2010).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Final Official Action for U.S. Appl. No. 11/510,284 (dated Jul. 9, 2009).
Notification of Transmittal of the International Search Report and the Written Opinion of the International Searching Authority, or the Declaration for International Application No. PCT/US2008/071718 (dated Jan. 28, 2009).
Official Action for U.S. Appl. No. 11/510,284 (dated Dec. 24, 2008).
Notification of Transmittal of the International Search Report and the Written Opinion of the International Searching Authority, or the Declaration for International Application No. PCT/US07/17329 (dated Feb. 15, 2008).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE INFOCOM, pp. 1414-1424 (1996).
Communication of European publication number and information on the application of Article 67(3) EPC for European Patent Application Serial No. 19791391.6 (dated Aug. 11, 2021).
Decision for Refusal for Indian Patent Application Serial No. 7526/CHENP/2012 (dated Jul. 22, 2021).
Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations," (Unpublished, filed Aug. 9, 2021).
Notification of Transmittal of the International Search Report and the Written Opinion of the International Searching Authority, or the Declaration for International Application No. PCT/US2021/024000 (dated Jun. 24, 2021).
Commonly-Assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).

(56) References Cited

OTHER PUBLICATIONS

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).

Non-Final Office Action for U.S. Appl. No. 17/074,553 (dated Aug. 18, 2021).

Notice of Allowance and Fee(s) Due for U.S. Appl. No. 16/730,799 (dated Aug. 16, 2021).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications Via Service Communications Proxy (SCP)" (Unpublished, filed Aug. 3, 2021).

Notice of Allowance and Fee(s) Due for U.S. Appl. No. 16/730,799 (dated Jul. 30, 2021).

"3rd Generation Partnership Project; Technical Specification Group Core Network and Terminals; 5G System; Principles and Guidelines for Services Definition; Stage 3 (Release 17)," 3GPP TS 29.501, V17.2.0, p. 1-78 (Jun. 2021).

Non-Final Office Action for U.S. Appl. No. 17/082,871 (dated Feb. 7, 2022).

Commonly-Assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).

Commonly-Assigned, co-pending U.S. Appl. No. 17/485,284 for "Methods, Systems and Computer Readable Media For Providing Priority Resolver for Resolving Priorities and Network Function (NF) Instances" (Unpublished, filed Sep. 24, 2021).

Notice of Allowance and Fee(s) Due for U.S. Appl. No. 16/356,446 (dated Sep. 30, 2021).

Notification of Transmittal of the International Search Report and the Written Opinion of the International Searching Authority, or the Declaration for International Application No. PCT/US2021/033031 (dated May 18, 2021).

Commonly-Assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).

Commonly-Assigned, co-pending U.S. Appl. No. 17/487,142 for "Methods, Systems, and Computer Readable Media for Network Function Discovery Using Preferred-Locality Information" (Unpublished, filed Sep. 28, 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

"3rd Generation Partnership Project; Technical Specification Group Core Network and Terminals; 5G System; Technical Realization of Service Based Architecture; Stage 3 (Release 17)." 3GPP TS 29.500, V17.2.0, pp. 1-100 (Mar. 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

Commonly-Assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646.

Vixie et al., "Dynamic Updates in the Domain Name System (DNS UPDATE)," Network Working Group, RFC 2136, pp. 1-26 (Apr. 1997).

Notice of Allowance for U.S. Appl. No. 17/156,149 (dated May 24, 2022).

Notice of Allowance for U.S. Appl. No. 17/156,149 (dated Apr. 19, 2022).

Communication of European Publication No. and Information on the Applicatoin of Article 67(3) EPC for European Patent Application Serial No. 20732441.9 (dated Apr. 6, 2022).

Non-Final Office Action for Chinese Patent Application Serial No. 201980067968.7 (dated Mar. 3, 2022).

First Examination Report for Indian Patent Application Serial No. 202147011137 (dated Mar. 9, 2022).

Commonly-Assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).

Notice of Allowance and Fee(s) Due for U.S. Appl. No. 17/074,553 (dated Dec. 29, 2021).

Notice of Allowance and Fee(s) Due for U.S. Appl. No. 17/001,599 (dated Nov. 17, 2021).

Notice of Allowance and Fee(s) Due for U.S. Appl. No. 17/102,404 (dated Oct. 7, 2021).

Notification of Transmittal of the International Search Report and the Written Opinion of the International Searching Authority, or the Declaration for International Application No. PCT/US2021/033031 (dated Sep. 16, 2021).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services: Stage 3 (Release 17)," 3GPP TS 29.510, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"Implementing Quality of Service Policies with DSCP," Cisco, pp. 1-7 (Feb. 15, 2008).

Notice of Allowance for U.S. Appl. No. 17/200,777 (dated Jun. 30, 2022).

Notice of Allowance for U.S. Appl. No. 17/009,725 (dated Jun. 13, 2022).

Notice of Publication for European Patent Application Serial No. 20733169.5 (dated Jun. 9, 2022).

Final Office Action for U.S. Appl. No. 17/082,871 (dated Jun. 6, 2022).

\* cited by examiner

METHODS, SYSTEMS, AND COMPUTER READABLE MEDIA FOR PREFERRED NETWORK FUNCTION (NF) LOCATION ROUTING USING SERVICE COMMUNICATIONS PROXY (SCP)

TECHNICAL FIELD

The subject matter described herein relates to routing messages to producer network functions in 5G communications networks. More particularly, the subject matter described herein relates to methods, systems, and computer readable media for preferred NF location routing using a service communications proxy.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of fully qualified domain name (FQDN)/Internet protocol (IP) address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can query or subscribe to receive information about NF service instances is a service communication proxy (SCP). The SCP subscribes with the NRF and obtains reachability and service profile information regarding registered producer NF service instances. Consumer NFs connect to the service communication proxy, and the service communication proxy load balances or provides alternate/optimal routing among producer NF service instances that provide the required service or directly routes the traffic to the destination producer NF.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

The service gateway is a node that sits in front of a group of producer NFs that provide a given service. The service gateway may load balance incoming service requests among the producer NF that provide the service in a manner similar to the SCP.

The service mesh is a name for a group of intermediate proxy nodes that enable communications between producer and consumer NFs. The service mesh may include one or more SCPs, SEPPs, and service gateways.

One problem that occurs in 5G communications networks is that consumer NFs may not select optimal producer NFs to handle a particular service. For example, a consumer NF may obtain a list of producer NFs to handle a particular service request from an NRF. The NRF may execute an internal policy to adjust priority of producer NFs in the discovery response. However due to lack of basic information about location information of the consumer NF, the NRF may not be able to provide optimal guidance on priority of producer NFs. The consumer NF may execute internal policy to select one of the producer NFs to handle the service request. However, the consumer NF may not select an optimal producer in NF to handle the service request. For example, a consumer NF located in one geographic area may select a producer NF that is located in a different geographic area when there is an available producer NF in the same or closest data center as the consumer NF. In addition, in light of the number of consumer NFs, requiring each consumer NF to implement a preferred producer NF selection algorithm becomes a scalability problem.

Accordingly, in light of these difficulties, there exists a need for improved methods, systems, and computer readable media for selecting and routing service requests to producer NFs.

SUMMARY

A method for preferred network function (NF) location based routing using a service communication proxy (SCP) includes receiving a service request message from a consumer NF. The method further includes performing, by an SCP, a lookup in a preferred NF location routing rules database at the SCP using at least one parameter extracted from the service request header or body of the message. The method further includes locating, by the SCP and in the preferred NF location routing rules database, a preferred NF location routing rule corresponding to the at least one parameter extracted from the header or body of the service request message. The method further includes selecting, by the SCP, a producer NF to process the service request based on application of the preferred NF location routing rule. The method further includes routing, by the SCP, the service request message to the producer NF.

According to another aspect of the subject matter described herein, receiving a service request message includes receiving a service request with indirect communication through SCP with or without delegated discovery from consumer and wherein selecting a producer NF includes obtaining a list of NFs from NFs registered with the SCP or querying a network function repository function (NRF) to obtain a list of NFs capable of providing the service and selecting the producer NF from the list.

According to another aspect of the subject matter described herein, performing the lookup in the preferred NF location routing rules database includes performing the lookup using a third generation partnership project (3GPP) service identifier in the service request message.

According to another aspect of the subject matter described herein, performing the lookup in the preferred NF location routing rules database includes performing the lookup using a subscription identifier or any other parameter present in header or body in addition to the service identifier.

According to another aspect of the subject matter described herein, performing the lookup using a subscription identifier or any other parameter present in header or body includes performing the lookup using the subscription identifier, wherein the subscription identifier comprises a subscription permanent identifier (SUPI) from the service request message.

According to another aspect of the subject matter described herein, selecting the producer NF using the preferred NF location routing rule includes selecting an available producer NF using a domain address as an indicator of location of the producer NF.

According to another aspect of the subject matter described herein, selecting the producer NF using the preferred NF location routing rule includes selecting an available producer NF using an Internet protocol address as an indicator location of the producer NF.

According to another aspect of the subject matter described herein, selecting the producer NF includes ordering a list of producer NFs according to priority specified by the preferred NF location routing rule and selecting a highest priority available producer NF in the list as the producer NF to process the service request message.

According to another aspect of the subject matter described herein, a system for preferred network function (NF) location based routing using a service communication proxy (SCP) is provided. The system includes an SCP including at least one processor and a memory. The system further includes a preferred NF location routing rules database located in the memory. The system further includes a preferred NF location routing module implemented by the at least one processor for receiving a service request message from a consumer NF, performing a lookup in a preferred NF location routing rules database using at least one parameter extracted from the service request message, locating, in the preferred NF location routing rules database, a preferred NF location routing rule corresponding to the at least one parameter extracted from the service request message, selecting a producer NF to process the service request based on application of the preferred NF location routing rule, and routing the service request message to the producer NF.

According to another aspect of the subject matter described herein, the preferred NF location routing module is configured to receive a service request with indirect communication through SCP with or without delegated discovery from consumer and select a producer NF by obtaining a list of NFs from NFs registered with the SCP or querying a network function repository function (NRF) to obtain a list of NFs capable of providing the service and selecting the producer NF from the list.

According to another aspect of the subject matter described herein, the preferred NF location routing module is configured to perform the lookup in the preferred NF location routing rules database using a third generation partnership project (3GPP) service identifier in the service request message.

According to another aspect of the subject matter described herein, the preferred NF location routing module is configured to perform the lookup in the preferred NF location routing rules database using a subscription permanent identifier (SUPI) or any other parameter present in the header or body of the service request message.

According to another aspect of the subject matter described herein, the preferred NF location routing module is configured to select an available producer NF using a domain identifier as an indicator of location of the producer NF.

According to another aspect of the subject matter described herein, the preferred NF location routing module is configured to select an available producer NF using an Internet protocol address as an indicator location of the producer NF.

According to another aspect of the subject matter described herein, the preferred NF location routing module is configured to order a list of producer NFs according to priority specified by the preferred NF location routing rule and select a highest priority available producer NF in the list as the producer NF to process the service request.

According to another aspect of the subject matter described herein, a non-transitory computer readable medium having stored thereon executable instructions that when executed by the processor of a computer control the computer to perform steps. The steps include receiving a service request message from a consumer NF. The steps further include performing a lookup in a preferred NF location routing rules database using at least one parameter extracted from the header or body of the service request message. The steps further include locating, in the preferred NF location routing rules database, a preferred NF location routing rule corresponding to the at least one parameter extracted from the service request message. The steps further include selecting a producer NF to process the service request based on application of the preferred NF location routing rule. The steps further include routing the service request message to the producer NF.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
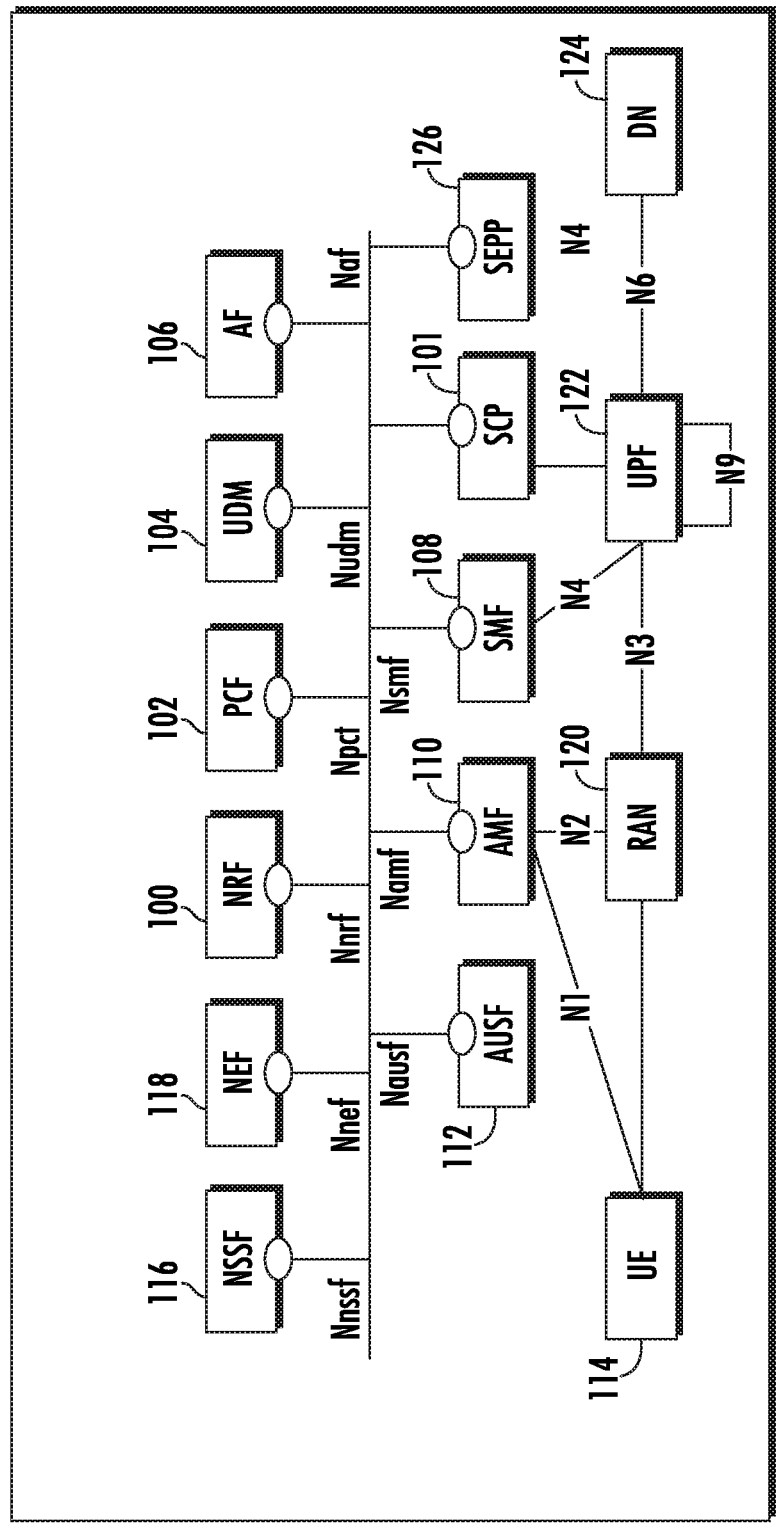
FIG. 1 is a network diagram illustrating an exemplary 5G service architecture.

The subject matter described herein relates to methods, systems, and computer readable media for preferred NF location routing using an SCP. The subject matter may be implemented in a 5G system network architecture or a network architecture that includes both 5G and non-5G network elements. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. SCP 101 may perform load balancing of connections between consumer and producer NFs. In addition, using the methodologies described herein, SCP 101 may perform preferred NF location based selection and routing.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

Figure 2:
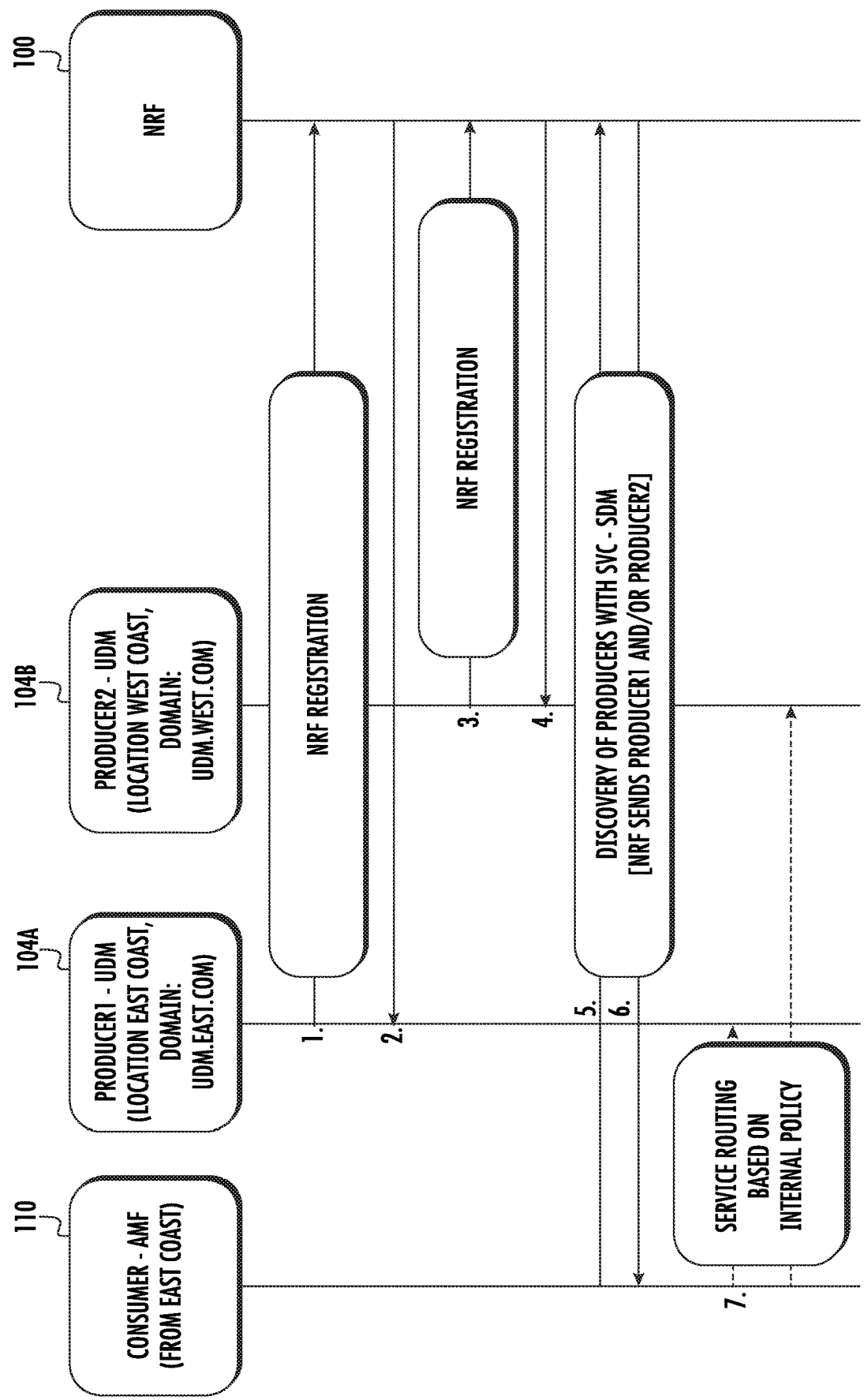
FIG. 2 is a message flow diagram illustrating exemplary messages exchanged between a consumer NF, an NRF, and producer NFs in performing 5G service routing without an SCP.

As stated above, one problem with conventional 5G service routing is that consumer NF may not select the optimal producer NF to handle a given service request. FIG. 2 is a message flow diagram illustrating exemplary messaging exchange between a consumer NF, an NRF, and producer NF in a situation where the consumer NF selects the producer NF without an SCP. Referring to FIG. 2, in line 1, a producer NF, which in the illustrated example is a UDM, registers with NRF 100. Producer NF 104A is located on the east coast with the domain udm.east.com. NRF 100 receives the NRF registration request and records or stores registration details regarding producer NF 104A. The registration details may include the type of service provided by producer NF 104A, the domain, and the capacity of producer NF 104A. In line 2 of the message flow diagram, NRF 100 responds to the registration request indicating that the registration was successful.

In line 3 of the message flow diagram, the producer NF 104B sends an NRF registration request to NRF 100. Producer NF 104B is also a UDM. Producer NF 104B is located on the west coast with the domain udm.west.com. NRF 100 receives the registration request and stores the registration details regarding producer NF 104B. In line 4 of the message flow diagram, NRF 100 responds to the NRF registration request indicating that the registration was successful.

In line 5 of the message flow diagram, a consumer NF 110 sends a discovery request message to NRF 100. The discovery request message includes the type of service requested. NRF 100 receives the service discovery request and performs a lookup in its service database to identify potential producer NFs that provide the service. In line 6 of the message flow diagram, NRF 100 responds to the service discovery request with a list of one or more producer NFs that are capable of providing the requested service. In the illustrated example, it is assumed that NRF 100 responds with a list including producer NF 104A and producer NF 104B.

Consumer NF 110 receives the list of producer NFs from NRF 100 and selects one of the producer NFs to handle a service request based on internal policy of consumer NF 110. As stated above, consumer NF 110 may implement a suboptimal policy and select a producer NF that is located in a different or even a furthest data center from consumer NF 110, which may result in increased latency in providing the service.

Figure 3:
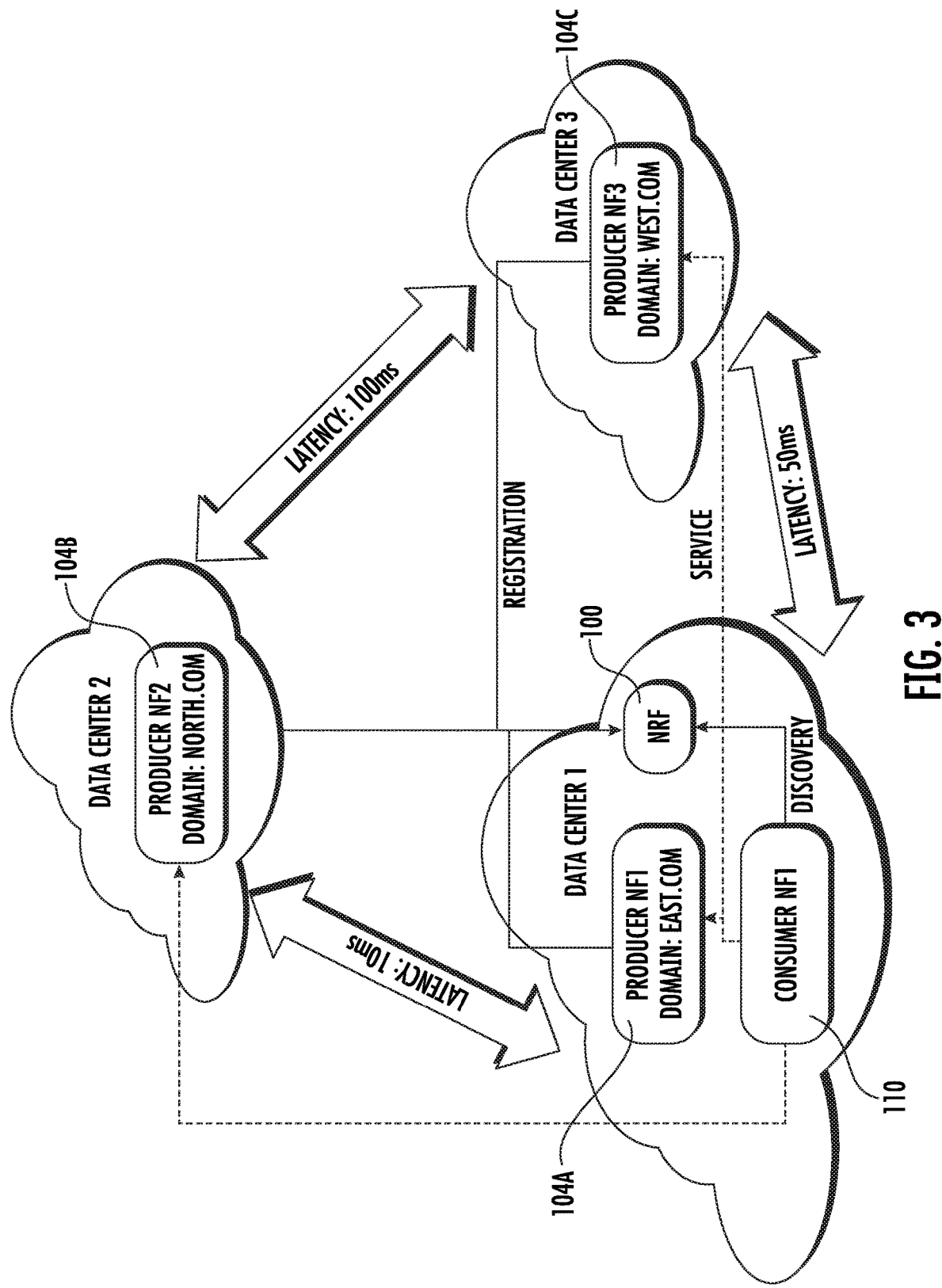
FIG. 3 is a network diagram illustrating consumer and producer NFs located in data centers in different geographic areas.

FIG. 3 illustrates the problem of suboptimal producer NF selection in further detail. Referring to FIG. 3, producer NF 104A is located in data center 1 on the east coast. Producer NF 104B is located in data center 2 in the northern region. Producer NF 104C is located in a data center in the western region. A consumer NF 110 resides in data center 1 along with an NRF 100. If consumer NF 110 requires a service provided by one of producer NFs 104A, 104B, and 104C, assuming all three producer NFs are available with the same priority, producer NF 104A is the producer NF that is capable of providing the service with the lowest amount of latency.

Producer NFs 104A, 104B, and 104C publish their service details to an NRF 100. However, there is no way for producer NFs 104A, 104B, and 104C to publish general guidelines/attributes/information for the NRF or consumer NF to follow a certain priority with to use their services. A producer can publish and allow the domain range and other attributes which will make the producer NF either discoverable or undiscoverable at the NRF for given consumer domains. However, there is no way for producer NFs to publish the adjusted preference/priority list for a given consumer domains.

For a consumer NF, it is optional to include the requester-NF-instance-ID or the requester-NF-instance-FQDN in the discovery request. Therefore when the consumer NF sends a discovery request, the NRF does not always have the required data to generate the correct set of producer NFs with updated priority order for a given NF instance. As a result, the consumer NF may select a producer NF that is not the best possible producer NF to handle a service request. For example, in FIG. 3, consumer NF 110 may select producer NF 104B or producer NF 104C to handle a service request, even though producer NF 104A is available. Produce NFs that are co-located with consumer NFs are preferred because of low latency and lower round trip time (RTT) for messaging with the consumer NFs. In addition, there may be scenarios where the consumer NF may want to reach the alternate producer in another region/location/domain, for example, when the producer NF located in the same data center as the consumer NF is down. In such a case, it may be desirable for consumer NF 110 to select the producer NF in the next closest data center. Continuing with the example and FIG. 3, if producer NF 104A is down, because of better latency between data center 1 and data center 2 consumer NF 110 would preferably select producer NF 104B. However, producer NF instances cannot register with the NRF to help the discovery response in such scenarios.

In summary, when there are multiple producer NFs available, the 3GPP standards do not specify an approach or solution for the consumer NF to find preferred producers for each consumer's regions. Complex policies to select the closest producer based on operator policy is challenging to implement in consumer NF instances.

Figure 4:
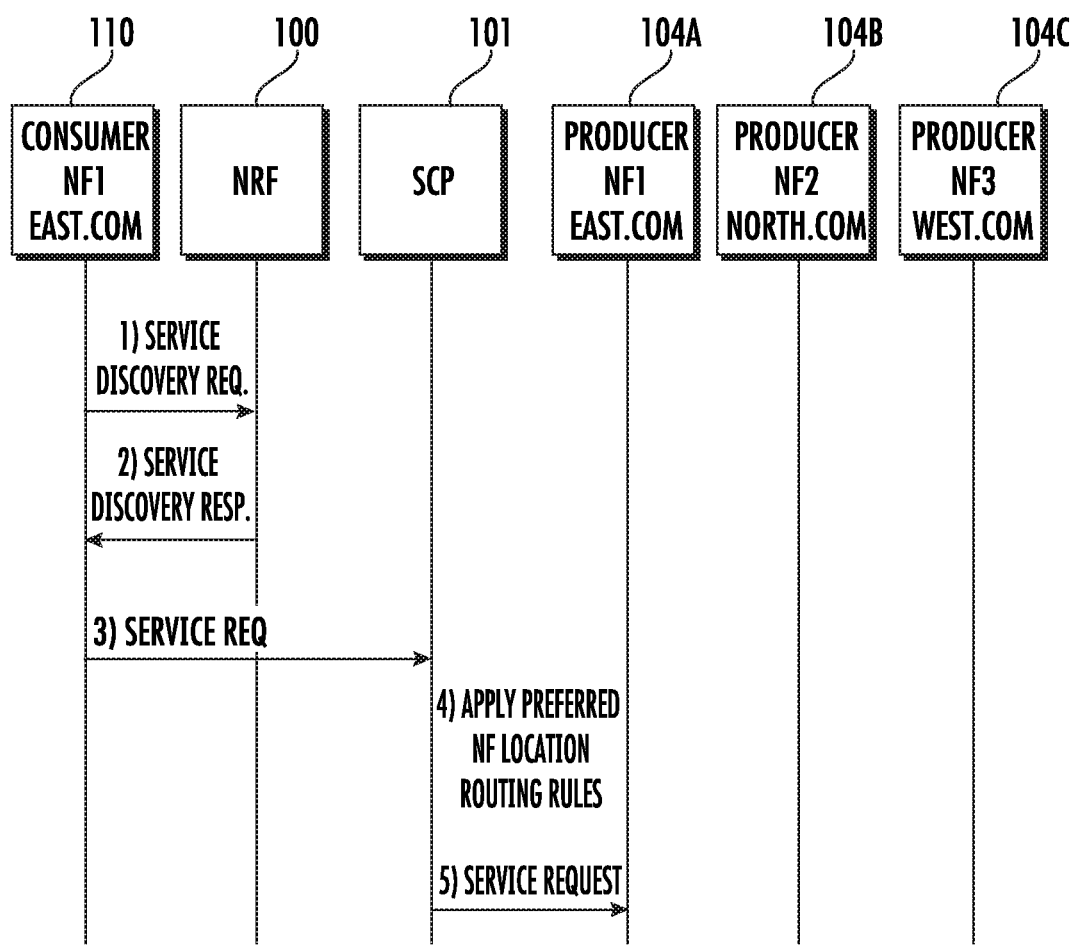
FIG. 4 is a message flow diagram illustrating exemplary messages exchanged between a consumer NF, an NRF, an SCP, and a producer NF in performing preferred NF location routing where the consumer NF obtains an initial list of producer NFs from the NRF and executes its local policy to select a producer.

Accordingly, in light of these difficulties, an SCP at a geographical location may be configured with preferred NF location routing rules for selecting preferred producer NFs to handle service requests. An SCP is a more optimal location to implement preferred NF location routing rules because of its strategic position in the network. An SCP may implement preferred NF location routing rules upon receiving a service request with or without a producer NF selected by the consumer. FIG. 4 is a message flow diagram where preferred NF location routing and SCP 101 receives a service request from a consumer NF. The message flow in FIG. 4 follows model C in Section E1 of 3GPP TS 23.501 where the consumer NF performs discovery, selects an NF and sends a service request with a selected producer NF to the SCP. However, in the illustrated example, the SCP applies preferred NF location routing rules to select an optimal producer NF for handling the service request and routing the service request to the selected producer NF.

Referring to the message flow in FIG. 4, in line 1, consumer NF 110 sends a service discovery request to NRF 100. NRF 100 receives the service discovery request and identifies a list of NFs capable of providing the service identified in the service discovery request. In the example in FIG. 4, it is assumed that the list of NFs includes producer NF 104A, producer NF 104B, and producer NF 104C.

In line 2 of the message flow diagram, NRF 100 sends the service discovery response with the list of NFs to consumer NF 110. Consumer NF 110 receives the service discovery response and selects one of the producer NFs to handle the service request.

In line 3 of the message flow diagram, consumer NF 110 sends a service request to SCP 101. SCP 101 receives the service request and determines whether a preferred NF location routing rule is provisioned for the service request. In this example, it is assumed that a preferred NF location routing rule is provisioned. Accordingly, in line 4, SCP 101 applies the preferred NF location routing rule. In this example, it is assumed that application of the preferred NF location routing rule results in selection of producer NF 104A. Accordingly, in line 4, SCP 101 routes the service request to producer NF 104A.

Figure 5:
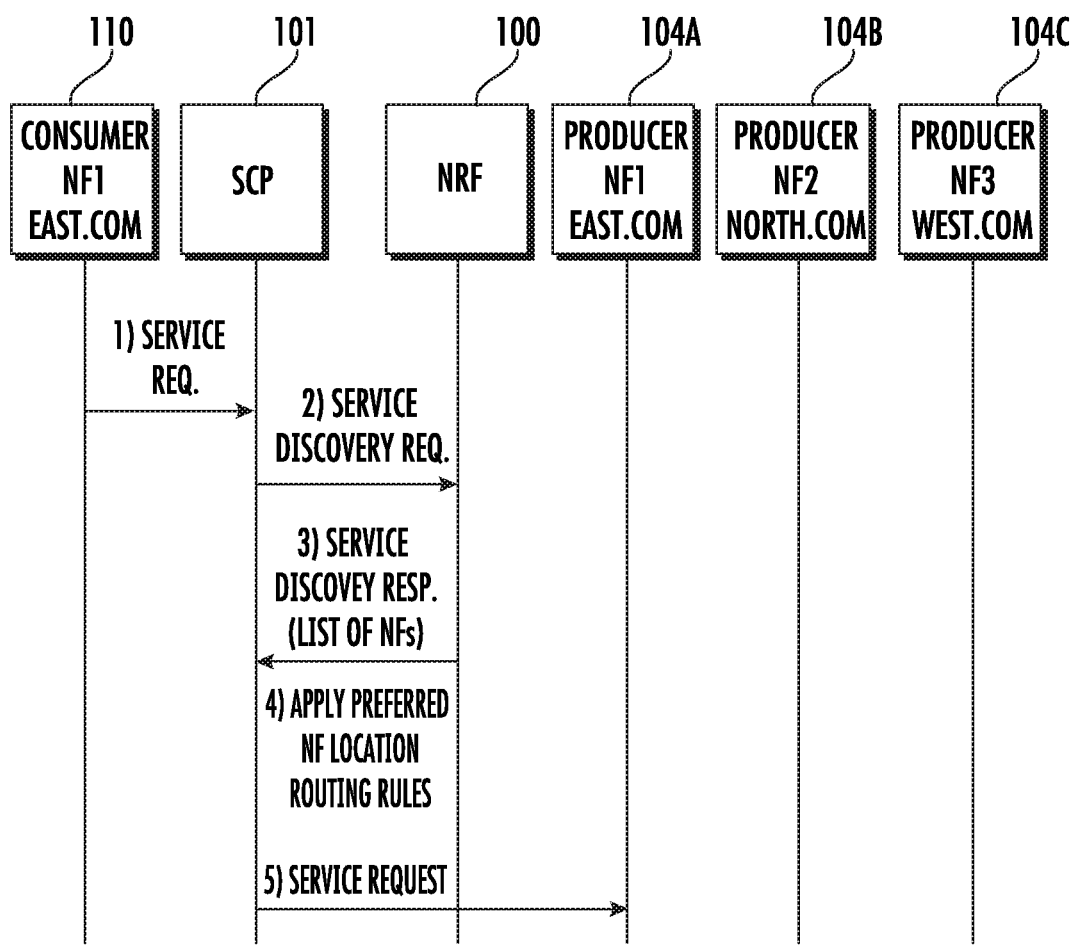
FIG. 5 is a message flow diagram illustrating exemplary messages exchanged between a consumer NF, an SCP, an NRF, and a producer NF where a consumer NF sends a service request to the SCP without first obtaining a list of producer NFs from the NRF.

As stated above, in another example, SCP 101 may implement preferred NF location routing without receiving selected producer NF from the consumer NF. FIG. 5 is a message flow diagram illustrating this case. Referring to FIG. 5, in line 1 of the message flow diagram, consumer NF 110 sends a service request to SCP 101. SCP 101 sends a service discovery request to NRF 100 to identify a list of producer NFs that are capable of handling the service request. NRF 100 receives the service discovery request, performs a lookup in its database, and identifies a list of NFs that are capable of handling the service request. In line 3 of the message flow diagram, NRF 100 sends a service discovery response to SCP 101 with the list of NFs that are capable of handling the service request.

In line 4, SCP 101 applies preferred NF location routing rules to select one of the NFs from the list of NFs to handle the service request. In the illustrated example, it is assumed that application of the preferred NF location routing rule results in selection of producer NF 104A. Accordingly, in line 5 of the message flow diagram, SCP 101 sends the service request to producer NF 104A.

Figure 6:
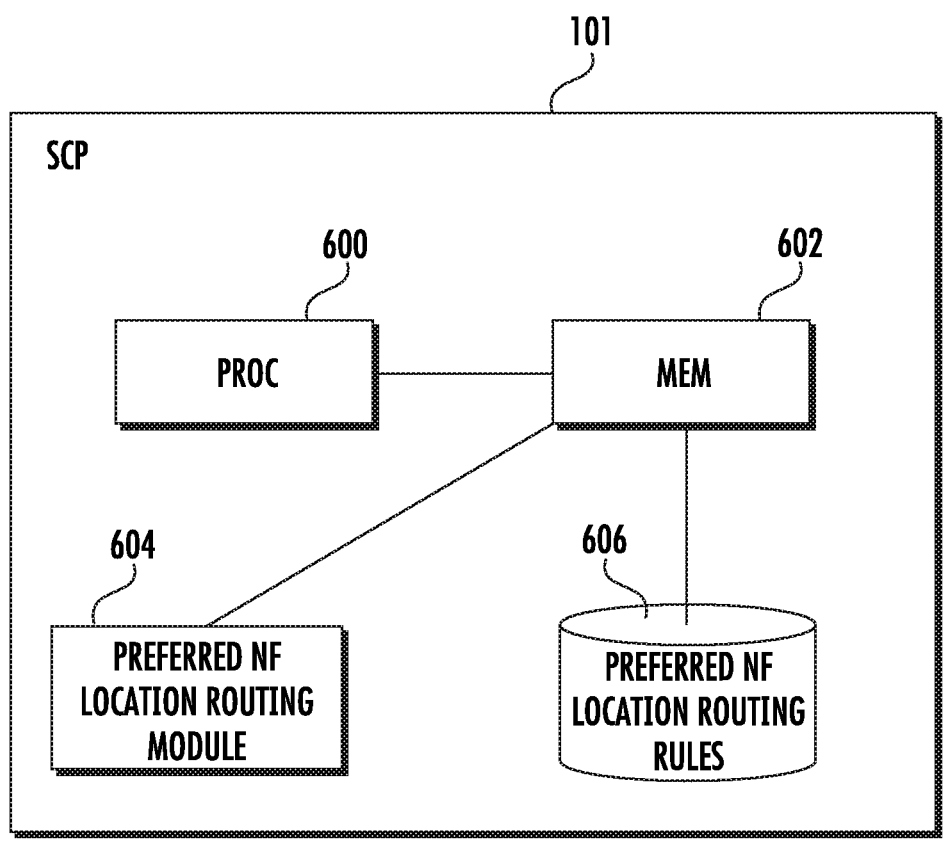
FIG. 6 is a block diagram of an SCP with a preferred NF location routing module and a preferred NF location routing rules database.

FIG. 6 is a block diagram illustrating an exemplary architecture for SCP 101. Referring to FIG. 6, SCP 101 includes at least one processor 600 and a memory 602. SCP 101 further includes a preferred NF location routing module 604 that implements preferred NF location routing as described herein and a preferred NF location routing rules database 606 containing rules for preferentially selecting producer NFs to handle service requests based on location. Tables 1 and 2 showing below illustrate exemplary preferred NF routing rules that may be provisioned in preferred NF location routing rules database 606.

TABLE 1

Preferred NF Location Routing Rules

| Service | Flow | Additional rule | Description |
| --- | --- | --- | --- |
| npcf-smpolicycontrol | Initial | * | Apply preferred domain routing for all initial messages for SM policy towards PCF instances |

TABLE 1-continued

Preferred NF Location Routing Rules

| Service | Flow | Additional rule | Description |
| --- | --- | --- | --- |
| npcf-am-policycontrol | Initial & Subsequent | SUPI = Range (X-Y) | For AM policy and SUPI between range X-Y, apply preferred domain routing |
| nudm-uecm | Subsequent | URI suffix = amf-non-3gpp-access | Apply preferred domain routing only for subsequent messages of nudm-uecm service registration messages for non-3gpp access |
| * | Initial & Subsequent | producer domain = north.oracle.com | Apply preferred domain routing for any service message towards producer authority with domain "north.oracle.com" |
| * | Initial & Subsequent | * | Apply preferred domain for all services |

TABLE 2

Producer NF Location Preferences

| Domain | Preference (Lower number indicates higher preference) |
| --- | --- |
| east.oracle.com | 0 |
| central.oracle.com | 1 |
| North-east.oracle.com | 1 |
| North.oracle.com | 2 |

In Table 2, the priorities are assigned based on domain of producer NFs. 3GPP TS 29.510 (Releases 15 and 16) mandates that producer NFs register their services with fully qualified domain names (FQDNs) and/or IP address. Either one of these parameters may be used to implement preferred NF location routing rules as described herein. The FQDN contains producer service location given by its domain. For example, the domain pcf1.oracle.com indicates a policy control function host in the oracle.com domain. Similarly, operator deployments have IP subset ranges for given regions. The SCP can use domains or IP subset ranges to select the closest available producer NF to handle a given service request. Preferred NF location routing rules may be used to find or override consumer NF preferences for producer NF selection or reselection.

In Table 1, the routing rules are configured based on attributes available in header or body of service message. The first rule in Table 1 indicates that all initial session management policy control function (nudm-smpolicycontrol) service requests will have NF preferred location routing applied to select the preferred policy control function for handling the requests. Session management policy control service is performed by a PCF and includes provisioning, updating, and removing session-related policies for an SMF. It should be noted that the location priorities in Table 2 are specific and exclusive to an SCP's location. For example, in Table 2, the domain east.oracle.com is the most preferred domain, which indicates that the rules in Table 2 may be for an SCP located in the domain east.oracle.com. When an SCP configured with the preferential routing rules receives an initial service request requesting session management policy control (npcf-smpolicycontrol) service, the service request matches the first rule in Table 1. The action specified by the first rule in Table 1 is "Apply preferred domain routing for all initial messages for SM policy towards PCF instances", which indicates that the domains in Table 2 should be applied in priority order to select a producer NF. In Table 2, the domains are listed in priority order. Accordingly, if the SCP has a list of PCFs capable of handling the service requests, the SCP will select the PCF with the most preferred domain according to the preference order listed in Table 2 and route the service request to the PCF instance having the FQDN that matches with most preferred domain.

The second rule in Table 1 indicates that initial and subsequent service requests for access and mobility policy control (npcf-am-policy-control) service with a specific subscription permanent identifier (SUPI) range will have NF preferred location routing rules applied. Access and mobility policy control services provides AMF access control and mobility management related policies to the AMF, which includes policy creation based on a request from the AMF during UE registration, 2) notification of the AMF of updated policies which are subscribed, and 3) deletion of the policy context for a UE. Thus, if an initial or subsequent message requesting npcf-am-policy control service is received by the SCP and the message has a SUPI within the range X-Y, the SCP will use the domain preferences in Table 2 to select a PCF to provide the npcf-am-policy-control service. If the message does not have a SUPI within the range X-Y, the action specified by the second rule in Table 1 will not apply. However, the fifth rule in Table 1 is a default rule indicating that preferred domain (location) based routing will be applied to all services if one of the more specific rules does not apply. Continuing with the example, a request for npcf-am-policy service with a SUPI range that does not match the second rule will still have preferred location-based routing applied because of the default fifth rule in Table 1.

The third rule in Table 1 indicates that when messages requesting nudm user equipment context management (nudm-uecm) service are received, preferred NF location routing will be applied only for subsequent messages for nudm registration for non-3GPP access. Nudm user equipment context management service provides the consumer NF with information relating to the UE's transaction information, allows the consumer NF to register and deregister it information for the service UE in the UDM, and allows the consumer NF to update UE context information in the UDM. The consumer of nudm-uecm service is an AMF. The producer NF is a UDM. Accordingly, if a message arrives at the SCP requesting nudm-uecm service, the SCP will determine if the message is an initial or subsequent message. If the message is a subsequent message, the SCP will determine whether the message is for non-3GPP access. If the message is for non-3GPP access, the SCP will use preferred domain order listed in Table 2 to select a UDM for providing the service and will route the message to the selected UDM.

The fourth rule in Table 1 indicates that preferred domain routing will be applied for any service messages towards a producer having the domain north.oracle.com. The fifth row in Table 1 indicates that preferred domain based routing will be applied for all services at the default if a specific rule is not provisioned as an exception. It should be noted that Table 6.3.1 of 3GPP TS 23.501 contains guidelines for selection and reselection of producer NFs that may be implemented by SCP 101. Since the data for selected preferred producer NFs is local to an SCP instance, the operator can configure different location preference rules for SCPs located in different regions. However, this is much easier than configuring every consumer NF to select preferred producer NF according to location.

Figure 7:
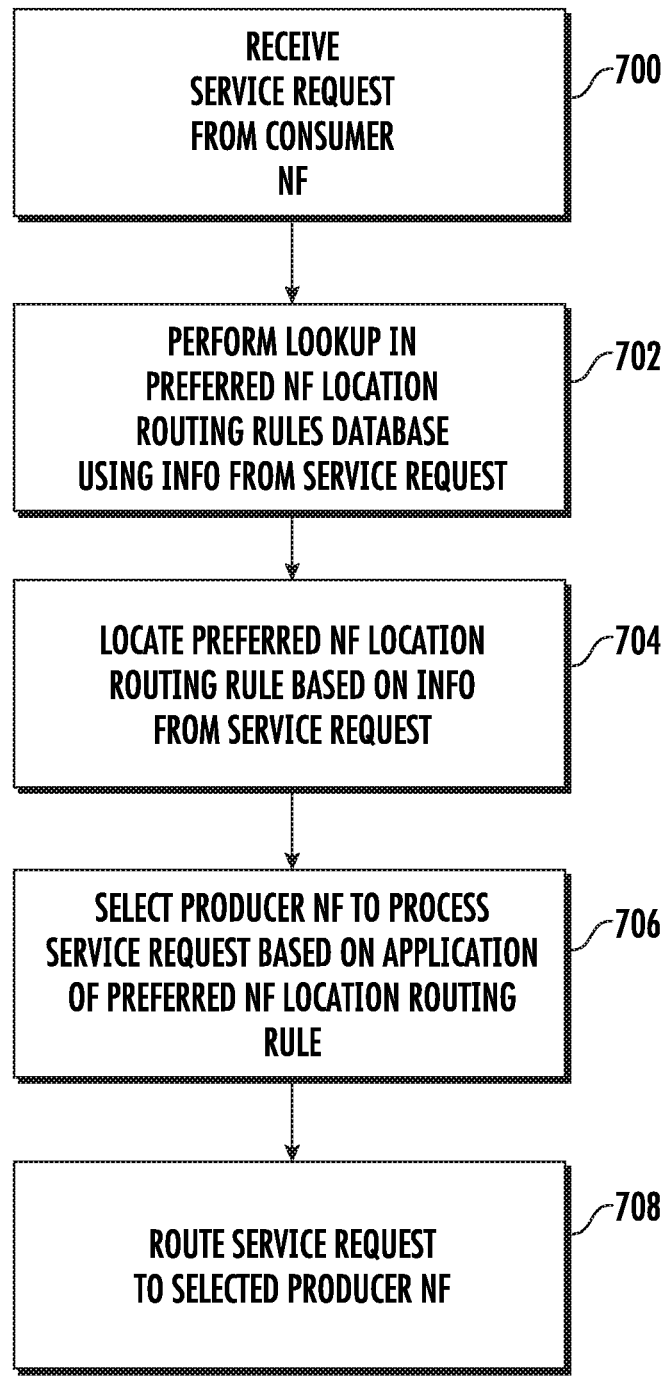
FIG. 7 is a flow chart for setting an exemplary process for preferred NF location routing using an SCP.

FIG. 7 is a flow chart illustrating an exemplary overall process for applying preferred NF location selection and routing at an SCP. Referring to FIG. 7, in step 700, an SCP receives a service request from a consumer NF. For example, SCP 101 may receive a service request from a consumer NF 110 in the same domain as SCP 101. The service request may identify the service and may optionally contain the consumer NF's selected producer NF that is capable of handling the service request.

In step 702, SCP 101 performs a lookup in the preferred NF location routing rules database using information from the service request. The information used to perform the lookup may include an identifier for the service type and other more specific parameters. Examples of parameters that identify service types are 3GPP service identifiers for nudm-sm-policycontrol, nudm-am-policycontrol, and nudm-uecm, which respectively identify session management policy control service, access and mobility policy control service, and UE context management service. Examples of other parameters from the service request that may be used to perform the lookup in the preferred NF location routing rules database include the SUPI, DNN and the domain of the requesting NF.

In step 704, the SCP locates a preferred NF location routing rule based on the information from the service request. For example, SCP 101 may locate a rule, such as one of the rules illustrated in Table 1, using parameters extracted from the service request message.

In step 706, the SCP selects a producer NF to process the service request based on application of the preferred NF location routing rule. For example, SCP 101 may utilize the domain preferences in Table 2 to select a producer NF that is preferred to handle a given service request. In an alternate example, selection may be performed based on IP address or other indication of location of the producer NF. In one example, the selected producer NF may be the producer NF with the highest domain or location preference that is capable of handling the service request.

In step 708, the service request is routed to the selected producer NF. For example, SCP 101 may route the service request to the producer NF selected using the preferred NF location routing rule.

Figure 8:
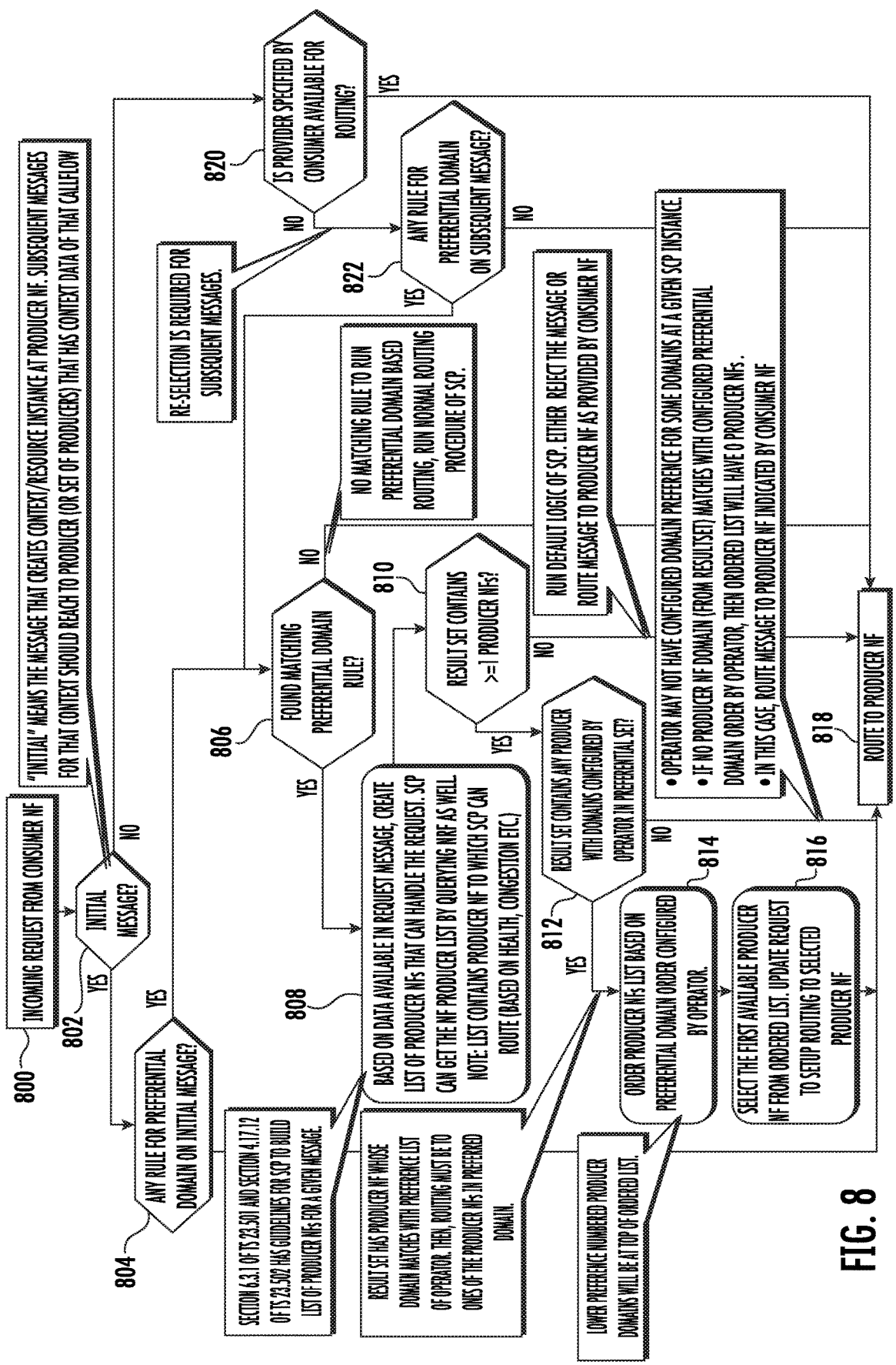
FIG. 8 is a detailed flow chart illustrating an exemplary process for preferred NF location routing using an SCP.

While FIG. 7 illustrates a single case where a message is received and rule applies, FIG. 8 is a more detailed flow chart of the algorithm that may be implemented by preferred NF location routing module 604. Referring to FIG. 8, in step 800, an incoming service request arrives from a consumer NF. In step 802, it is determined whether the message is an initial message. An initial message means that the message of the message that creates a context or resource instance at the producer NF. Subsequent messages for the context should reach the same producer or set of producers that have the same context for the message flow.

If the message is an initial message, control proceeds to step 804 where it is determined whether there is a rule for preferred location-based routing of the message. If there is a rule, control proceeds to step 806 where it is determined whether an action rule is located. If a matching rule is located, control proceeds to step 808 where based on data in the request message, a list of producer NFs that can handle the request is generated. The SCP can obtain the list by querying the NRF. The list may contain producer NFs to which the SCP can route based on health, congestion, etc. Guidelines for producing such a list are found in section 6.3.1 of 3GPP TS 23.501 and section 4.17.12 of 3GPP TS 23.502.

After step 808, control proceeds to step 810 where it is determined whether the list includes one or more producer NFs. If the list contains one or more producer NFs, control proceeds to step 812 where it is determined whether the rule set contains any producer NFs with domains configured by the operator in the preferential set. If the list contains NFs in the preferential set, i.e., the rule has a producer NF whose domain matches with the preferences to the operator, then routing must be to one of the producer NFs in the preferred domain. In step 814, the list of producer NFs is ordered based on preferential domain order configured by the operator. In step 816, SCP 101 selects the first available producer NF from the ordered list and updates the request to set up routing to the selected producer NF. In step 818, SCP 101 routes to the selected producer NF.

Returning to step 802, if the message is not an initial message, control proceeds to step 820 where it is determined whether the provider is specified by the consumer and available for routing. If the provider is specified by the consumer and available for routing, control returns to step 818 where the messages are routed to the consumer specified producer NF.

In step 820, if the provider is not specified by the consumer for routing, control proceeds to step 822 where it is determined where there is any rule preferential location or domain based rule specified for the subsequent message. If there is a rule specified for the subsequent message, control proceeds to steps 806-818 where the rule is applied and used to select and route the message to the preferred NF. If a rule is not specified for the subsequent message, control proceeds to step 818 where the messages routed to a producer NF or rejected based on operator policy.

The subject matter described herein includes preferred NF location rules implemented by an SCP. Implementing preferred NF location routing rules is advantageous because implementing such rules improves the functionality of computer networks by reducing latency in service transactions between consumer NFs and producer NFs. Preferred NF location routing as described herein allows preferred NF selection based on service type and/or other message parameters, such as SUPI or domain. Preferred NF location routing also allows rerouting of service requests after an initial selection by a consumer NF and routing of service request that accounts for NF failure. Implementing preferred NF location routing rules at an SCP is advantageous because implementing the rules at the SCP reduces the need for NRF or consumer NFs to be provisioned with complex preferred NF location routing rules and thus makes scaling and updating of routing rules more efficient for a geographical location.

The disclosure of each of the following references is hereby incorporated herein by reference in its entirety:

REFERENCES 1. 3GPP TS 23.501; $3^{rd}$ Generation Partnership Project; Technical Specification Group Services and System Aspects; System architecture for the 5G System (5GS); Stage 2 (Release 16) V16.4.0 (2020-03)
2. 3GPP TS 23.502; $3^{rd}$ Generation Partnership Project; Technical Specification Group Services and System Aspects; Procedures for the 5G System (5GS); Stage 2 (Release 16) (2020-03) V16.4.0 (2020-03)

3. 3GPP TS 29.510; 3$^{rd}$ Generation Partnership Project; Technical Specification Group Core Network and Terminals; 5G System; Network Function Repository Services; Stage 3 (Release 16), V16.4.0 (2020-07)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for preferred network function (NF) location based routing using a service communication proxy (SCP), the method comprising:
receiving, at an SCP and from a consumer NF, a service request message;
performing, by the SCP, a lookup in a preferred NF location routing rules database at the SCP using at least one parameter extracted from the service request message;
locating, by the SCP and in the preferred NF location routing rules database, a preferred NF location routing rule corresponding to the at least one parameter extracted from the service request message;
selecting, by the SCP, a producer NF to process the service request based on application of the preferred NF location routing rule, wherein the preferred NF location routing rule instructs the SCP to apply preferred domain routing, wherein selecting the producer NF includes applying preferred domain routing to select a producer NF based on a location priority configured for a domain of the producer NF based on a location of the SCP, wherein the preferred NF location routing rules database includes identifiers for a plurality of different producer NF domains and a plurality of different location priorities configured for the producer NF domains based on the location of the SCP, and wherein applying the preferred domain routing includes selecting, on behalf of the consumer NF, the producer NF having a most preferred configured location priority based on the location of the SCP; and
routing, by the SCP, the service request message to the producer NF.

2. The method of claim 1 wherein receiving a service request message includes receiving a service request message that identifies a consumer NF selected producer NF capable of providing a service requested by the service request message and wherein selecting a producer NF includes selecting one of the producer NFs based on application of the preferred NF location routing rule, from NFs registered with the SCP or by querying a network function repository function (NRF) to obtain a list of NFs capable of providing the service.

3. The method of claim 1 wherein receiving a service request message includes receiving a service request that does not identify a consumer NF selected producer NF capable of providing a service requested by the service request message and wherein selecting a producer NF includes obtaining a list of NFs from NFs registered with the SCP or querying a network function repository function (NRF) to obtain a list of NFs capable of providing the service and selecting the producer NF from the list.

4. The method of claim 1 performing the lookup in the preferred NF location routing rules database includes performing the lookup using a third generation partnership project (3GPP) service identifier in the service request message.

5. The method of claim 4 wherein performing a lookup in the preferred NF location routing rules database includes performing the lookup using a parameter in a header or a body of the service request message in addition to the service identifier.

6. The method of claim 5 wherein the parameter in the header or body of the service request message comprises a subscription identifier.

7. The method of claim 6 wherein the subscription identifier comprises a subscription permanent identifier (SUR) from the service request message.

8. The method of claim 1 wherein selecting the producer NF using the preferred NF location routing rule includes selecting an available producer NF using a domain address as an indicator of location of the producer NF.

9. The method of claim 1 wherein selecting the producer NF using the preferred NF location routing rule includes selecting an available producer NF using an Internet protocol address of the producer NF as an indicator location of the producer NF.

10. The method of claim 1 wherein selecting the producer NF includes ordering a list of producer NFs according to the location priorities and selecting the producer NF from the list.

11. A system for preferred network function (NF) location based routing using a service communication proxy (SCP), the system comprising:
an SCP including at least one processor and a memory;
a preferred NF location routing rules database located in the memory; and
a preferred NF location routing module implemented by the at least one processor for receiving a service request message from a consumer NF, performing a lookup in a preferred NF location routing rules database using at least one parameter extracted from the service request message, locating, in the preferred NF location routing rules database, a preferred NF location routing rule corresponding to the at least one parameter extracted from the service request message, selecting a producer NF to process the service request based on application of the preferred NF location routing rule, and routing the service request message to the producer NF, wherein the preferred NF location routing rule instructs the SCP to apply preferred domain routing, wherein selecting the producer NF includes applying preferred domain routing to select a producer NF based on a location priority configured for a domain of the producer NF based on a location of the SCP, wherein the preferred NF location routing rules database includes identifiers for a plurality of different producer NF domains and a plurality of different location priorities configured for the producer NF domains based on the location of the SCP, and wherein applying the preferred domain routing includes selecting, on behalf of the consumer NF, the producer NF having a most preferred configured location priority based on the location of the SCP.

12. The system of claim 11 wherein the preferred NF location routing module is configured to receive a service request message that identifies a consumer NF selected producer NF which is capable of providing a service requested by the service request message and select a producer NF from NFs registered with the SCP or querying a network function repository function (NRF) to obtain a list of NFs capable of providing the service.

13. The system of claim 11 wherein the preferred NF location routing module is configured to receive a service request that does not identify a consumer NF selected producer NF capable of providing a service requested by the service request message and select a producer NF by obtaining a list of NFs from NFs registered with the SCP or querying a network function repository function (NRF) to obtain a list of NFs capable of providing the service and selecting the producer NF from the list.

14. The system of claim 11 wherein the preferred NF location routing module is configured to perform the lookup in the preferred NF location routing rules database using a third generation partnership project (3GPP) service identifier in the service request message.

15. The system of claim 14 wherein the preferred NF location routing module is configured to perform the lookup in the preferred NF location routing rules database using a parameter or attribute present in the header or body of the service request message in addition to the service identifier.

16. The system of claim 15 wherein the parameter in the header of body of the service request message includes a subscription permanent identifier (SUPI).

17. The system of claim 11 wherein selecting the producer NF using the preferred NF location routing rule includes selecting an available producer NF using a domain address as an indicator of location of the producer NF.

18. The system of claim 11 wherein selecting the producer NF using the preferred NF location routing rule includes selecting an available producer NF using an Internet protocol address of the producer NF as an indicator location of the producer NF.

19. The system of claim 11 wherein selecting the producer NF includes ordering a list of producer NFs according to the location priorities and selecting the producer NF from the list.

20. A non-transitory computer readable medium having stored thereon executable instructions that when executed by a processor of a computer control the computer to perform steps comprising:
   receiving, at a service communication proxy (SCP) and from a consumer network function (NF) a service request message;
   performing, by the SCP, a lookup in a preferred NF location routing rules database at the SCP using at least one parameter extracted from the service request message;
   locating, by the SCP and in the preferred NF location routing rules database, a preferred NF location routing rule corresponding to the at least one parameter extracted from the service request message;
   selecting, by the SCP, a producer NF to process the service request based on application of the preferred NF location routing rule, wherein the preferred NF location routing rule instructs the SCP to apply preferred domain routing, wherein selecting the producer NF includes applying preferred domain routing to select a producer NF based on a location priority configured for a domain of the producer NF based on a location of the SCP, wherein the preferred NF location routing rules database includes identifiers for a plurality of different producer NF domains and a plurality of different location priorities configured for the producer NF domains based on the location of the SCP, and wherein applying the preferred domain routing includes selecting, on behalf of the consumer NF, the producer NF having a most preferred configured location priority based on the location of the SCP; and
   routing, by the SCP, the service request message to the producer NF.

\* \* \* \* \*

UNITED STATES PATENT AND TRADEMARK OFFICE
CERTIFICATE OF CORRECTION

PATENT NO. : 11,528,334 B2
APPLICATION NO. : 16/945794
DATED : December 13, 2022
INVENTOR(S) : Rajiv Krishan Page 1 of 2

It is certified that error appears in the above-identified patent and that said Letters Patent is hereby corrected as shown below:

On the Title Page

Column 1, under item (54) Title, Line 5, delete "COMMUNICATIONS" and insert
-- COMMUNICATION --, therefor.

On page 3, Column 2, under item (56) Other Publications, Line 26, delete "Communications" and insert -- Communication --, therefor.

On page 4, Column 1, under item (56) Other Publications, Line 50, delete ".eom" and insert
-- .com --, therefor.

On page 5, Column 1, under item (56) Other Publications, Line 30, delete "IEFT" and insert
-- IETF --, therefor.

On page 5, Column 1, under item (56) Other Publications, Line 45, delete "(IEFT) Netwok" and insert
-- (IETF) Network --, therefor.

On page 5, Column 2, under item (56) Other Publications, Line 56, delete "Communications" and insert -- Communication --, therefor.

On page 5, Column 2, under item (56) Other Publications, Line 56, delete "Repositor" and insert
-- Repository --, therefor.

On page 6, Column 2, under item (56) Other Publications, Line 34, delete "(SIP)-" and insert
-- (SIP)- --, therefor.

On page 7, Column 1, under item (56) Other Publications, Line 17, delete "Communications" and insert -- Communication --, therefor.

Signed and Sealed this
Eighth Day of August, 2023

Katherine Kelly Vidal
*Director of the United States Patent and Trademark Office*

On page 7, Column 1, under item (56) Other Publications, Line 44, delete "Communications" and insert -- Communication --, therefor.

On page 7, Column 1, under item (56) Other Publications, Line 44, delete "Communications" and insert -- Communication --, therefor.

On page 7, Column 2, under item (56) Other Publications, Line 24, delete "Applicatoin" and insert -- Application --, therefor.

In the Specification

In Column 1, Line 5, delete "COMMUNICATIONS" and insert -- COMMUNICATION --, therefor.

In Column 1, Line 14, delete "communications" and insert -- communication --, therefor.

In the Claims

In Column 14, Line 10, in Claim 7, delete "(SUR)" and insert -- (SUPI) --, therefor.